US009015135B2

(12) United States Patent
Bendig

(10) Patent No.: US 9,015,135 B2
(45) Date of Patent: Apr. 21, 2015

(54) PERSISTENCE LAYER

(75) Inventor: Oliver Bendig, Forst (DE)

(73) Assignee: SAP AG, Walldorf (DE)

( * ) Notice: Subject to any disclaimer, the term of this patent is extended or adjusted under 35 U.S.C. 154(b) by 1690 days.

(21) Appl. No.: 12/267,264

(22) Filed: Nov. 7, 2008

(65) Prior Publication Data

US 2010/0121829 A1    May 13, 2010

(51) Int. Cl.
*G06F 17/30* (2006.01)

(52) U.S. Cl.
CPC .... *G06F 17/30377* (2013.01); *G06F 17/30365* (2013.01)

(58) Field of Classification Search
CPC ................ G06F 17/30289; G06F 17/30345; G06F 11/1471; G06F 17/30371; G06F 17/30286
See application file for complete search history.

(56) References Cited

U.S. PATENT DOCUMENTS

| 6,801,914 | B2 * | 10/2004 | Barga et al. | 707/674 |
| 7,356,532 | B2 * | 4/2008 | Wiser et al. | 707/703 |
| 7,716,274 | B1 * | 5/2010 | Kumar | 709/203 |
| 7,890,466 | B2 * | 2/2011 | Kundu et al. | 707/648 |
| 2003/0046298 | A1 * | 3/2003 | Weedon | 707/102 |
| 2006/0136464 | A1 * | 6/2006 | Rossmann | 707/102 |
| 2006/0248119 | A1 * | 11/2006 | Stanev et al. | 707/104.1 |
| 2007/0112864 | A1 * | 5/2007 | Ben-Natan | 707/200 |

* cited by examiner

*Primary Examiner* — Michelle Owyang
(74) *Attorney, Agent, or Firm* — Blakely Sokoloff Taylor & Zafman LLP

(57) ABSTRACT

A system and method to separate business processing from data handling. A persistence layer resides between an application and a database. The persistence layer receives updates from the application and stores them in a memory delaying writeback to the database to a later time.

15 Claims, 3 Drawing Sheets

PERSISTENCE LAYER

FIELD OF INVENTION

Embodiments of the invention relate to data handling on a computer system. More specifically, embodiments of the invention relate to persistence layer between application logic and an underlying database access layer.

BACKGROUND

Generally, it is considered good software design practice to separate the data handling from the application logic within an application. To accommodate this practice, the application selects what data is requested and what data is changed or deleted, but then must delay the information for later update to the database. Sometimes retaining this information for later update is impractical or impossible for the application. As a result, the database is updated during some business processes. If an error then occurs during the further processing of the business logic, the database update needs to be undone or rolled back to its prior state. The case becomes even more complex and potentially error prone when additional applications support each other. Moreover, either the application must be programmed to support a simulation mode or simulations will result in database changes that must be subsequently rolled back.

SUMMARY

A system and method to separate business processing from data handling is disclosed. A persistence layer resides between an application and a database. The persistence layer receives updates from the application and stores them in a memory delaying writeback to the database to a later time.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
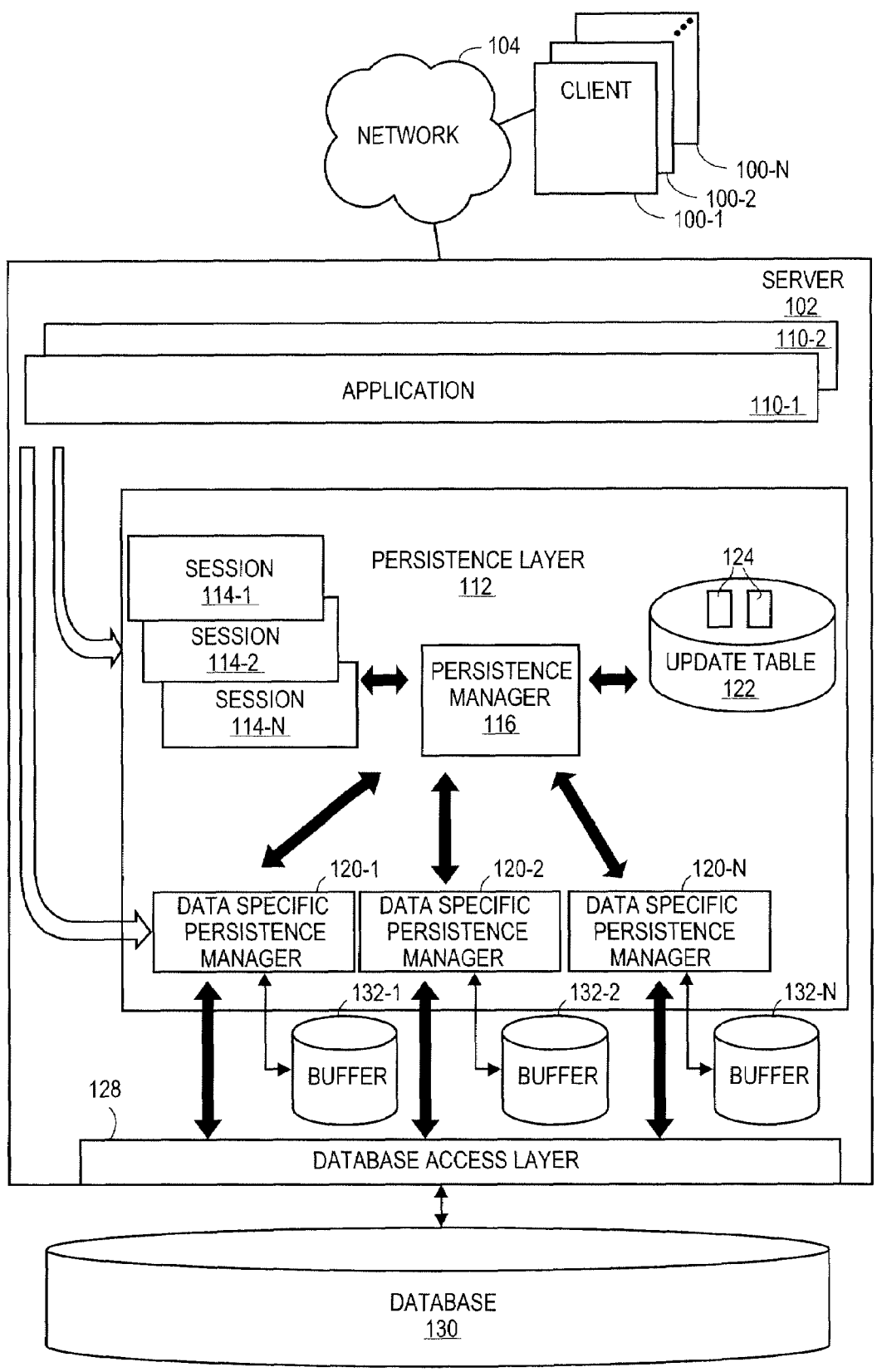
FIG. 1 is a block diagram of a system implemented in one embodiment of the invention.

FIG. 1 is a block diagram of a system implemented in one embodiment of the invention. Clients 100-1, 100-2, 100-N (generically client 100) communicate across network 104 with server 102. Network 104 may be a wide area network, such as the internet or a local area network, such as a corporate intranet. Server 102 may be implemented on substantially any physical platform as is known in the art. In one embodiment, server 102 executes within a virtual machine, such as a Java virtual machine (JVM).

Server 102 may have one or more applications 110-1, 110-2, etc. (generically application 110) executing thereon. Server 102 may also provide a database access layer 128 to provide access to database 130. A persistence layer 112 resides between application 110 and database access layer 128 and provides an abstraction of data handling for the application 110. The application 110 issues select requests and updates to persistence layer 112 which then provides that handling facility as described in more detail below. Ultimately, the application 110 does not care where the data comes from or where the updates are stored. The persistence layer 112, from the application 110 perspective, is the same as if accesses were directed to the database 130 directly.

Persistence layer 112 includes persistence manager 116 which is responsible for controlling a writeback of updates to the underlying data storage system. A session object 114-1, 114-2, 114-N (generically session 114) is associated with persistence manager 116 for its entire lifetime. The session object defines the mode of operation of the persistence layer for that session. For example, in one embodiment, the session object 114 indicates whether the persistence manager is operating in a normal mode, an enterprise services mode or a simulation mode. In normal mode, updates to the database 130 may be delayed, e.g., until after all business processing for the application is complete. In simulation mode, update to the database may not be written back at all. In enterprise service mode, updates may be delayed after the execution of an application until a further time until permitted under e.g. the design paradigm SAP AG of Walldorf, Germany applies to enterprise services.

The persistence manager 116 queries the session object 114 every time it handles a persistence object 124. The session object 114 dictates how the persistence manager 116 handles the persistence object. For example, if the persistence layer 112 is operating in simulation mode, the session object 114 tells the persistence manager that updates are complete without writing any updates to database 130.

Persistence manager 116 may instantiate one or more data specific persistence managers 120-1, 120-2, 120-N (generically data specific persistence manager 120) also referred to as subordinate persistence managers 120. For example, in a billing context, persistence manager 116 may instantiate a data specific persistence manager 120-1 to handle facts and a second data specific persistence manager 120-2 to handle billing account information. As used in this context, billing account information may be e.g., the particular account to be billed while facts may be values for the billing, such as flat rate. Because the optimal buffering characteristics may differ dramatically with different types of data, each data specific persistence manager 120 is allocated its own corresponding buffer 132-1, 132-2, 132-N (generically buffer 132) in memory to hold data of the type handled.

Also allocated in memory is an update table 122 used by persistence manager 116 to store updates received from application 110. While update table 122 is shown in the persistence layer 112, strictly speaking it is a region allocated in memory for use by the persistence layer. In one embodiment, update data received from application 110 is encapsulated as a persistence object 124. Typically, in one embodiment, an update will be stored as a single persistence object 124 and each successive update will be organized chronologically and updated table 122 as an additional persistence object. In one embodiment, persistence objects may include insert, update, delete methods and a timestamp along with corresponding data. The timestamp ensures that the database updates can be done in the correct chronological order. The buffers 132 hold the current database view, e.g., the view the application would expect the database 130 to have had the updates been executed immediately after being sent by the application. The update table 122 holds the persistence objects 124 in a chronological order that defines the changes necessary to cause the database 130 to have that current view.

Generally speaking, persistence manager 116 will accumulate updates in the update table until a later time when actual database update is desired, for example, when a database update request command is received from application 110. In one embodiment, persistence manager 116 may be a manager class and permit registration by the data specific persistence manager objects 120. Persistence manager 116 is responsible for managing the persistence objects 124 and their corresponding manager classes 120. Each persistence object 124 has exactly one manager class that can read the state of the object 124 and create database changes based on the object 124. The persistence manager 116 stores references to the subordinated persistence managers 120 and requests instantiation of needed data specific persistence managers 120 if they do not yet exist. When a data specific persistence manager 120 passes a new object 124 to persistence manager 116, it also registers with persistence manger 116. The object 124 is stored for later update to the database 130.

In some embodiments, responsive to a commit, persistence manager 116 calls the corresponding data specific persistence managers 120 to writeback the update data from the persistence objects 124 residing in update table 122. In other embodiments, the write back may be prevented (e.g., simulation mode) or further delayed beyond receipt of the database update request command from the application.

In one embodiment, flagged updates from update table 122 are written to buffers 132 rather than database 130. Referring to the discussion above, persistence object are flagged if the session 114 indicates that a persistence layer is in a simulation mode when the update data is received in the persistence layer 112. Otherwise, the data specific persistence manager 120 use database access layer 128 to update the database with the data from persistence objects 124 contained in update table 122.

In some embodiments, multiple executions/iterations of application 110 may apply to the same data or be required to process the entire data set. In such case, writeback may be delayed until all iterations of application 110 have occurred. The buffers 132 and update table 122 retain the current data and supply the data to the application 110 so that current data is supplied even where the data has not yet been written back to the database. In still other embodiments, where application 110-1 is supported by a second application 110-2 (that uses and may modify the same data) writebacks may be delayed until after application 110-2 completes its processing. This avoids putting temporary values, such as triggers into database 130.

Figure 2:
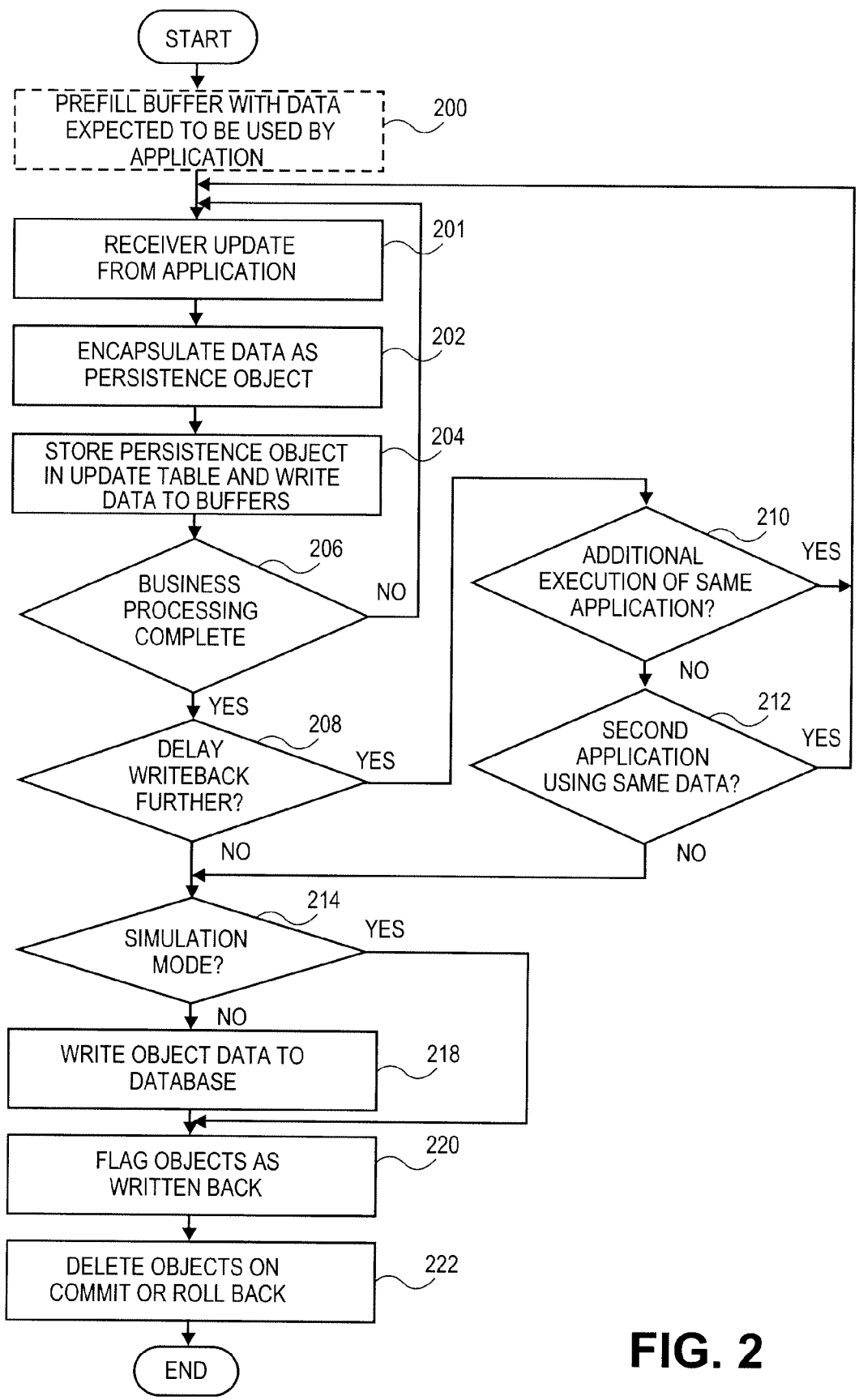
FIG. 2 is flow diagram of operation of the persistence layer of one embodiment of the invention.

FIG. 2 is flow diagram of operation of the persistence layer of one embodiment of the invention. In one embodiment, buffers (such as buffers 132 of FIG. 1) may be prefilled with data expected to be used by the application. This optional operation has the advantage of permitting a bulk transfer rather than individual selections from the database and may improve execution time. However, individual selection may be used by the Applicants to obtain data from the database via the persistence layer if the buffers have not been prefilled.

At block 201, an update is received in the persistence layer from the application. The data from the received update is encapsulated by the data specific persistence manager as a persistence object at block 202. The persistence object is stored in an update table at block 204 and the internal buffers (e.g., buffer 132) are updated with the current data. The determination is made at decision block 206 whether business processing is complete. If business processing is not complete, the persistence layer awaits more updates and delays writeback of any previously received updates. Generally, subsequent updates will be stored chronologically in the update table for delayed writeback to the database.

If business processing in the application is complete at block 206, a determination is made if it is desirable to delay writeback further at block 208. If writeback is to be further delayed, a determination is made at decision block 210 whether additional executions of the same application on the same data will occur. If so, persistence layer continues to wait for further updates from that application. If not, a determination is made whether a second application will use the same data at decision block 212. If the same data will be used by a second application, the persistence layer continues to await further updates before writing back any updates previously received.

If there is no second application using the same data, a determination is made at decision block 214, whether persistence layer is in simulation mode. If the system is not in simulation mode, the object data is written back to the database at block 218. If the persistence layer is in simulation mode, the writeback to the database is skipped. After, such writebacks or skipped writebacks, the objects in the update table are flagged as having been written back at block 220. Then at block 222 in response to receipt to either a commit or a rollback command, the objects in the update table are deleted.

Figure 3:
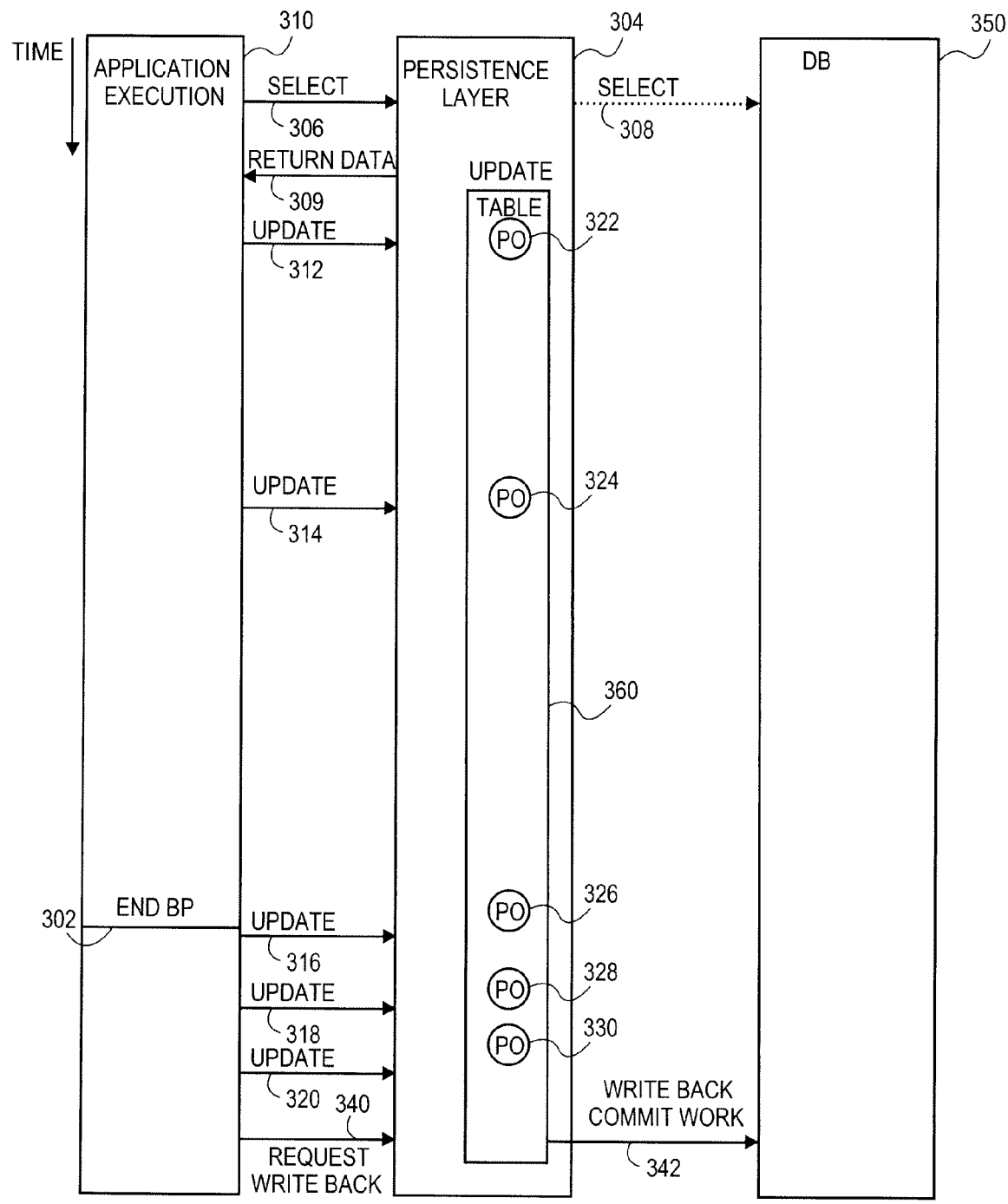
FIG. 3 is a diagram illustrating the timing relationships of activities in a system of one embodiment to the invention.

FIG. 3 is a diagram illustrating the timing relationships of activities in a system of one embodiment to the invention. The vertical axis is a time axis. The first rectangle at the left hand side represents application execution 310. Early in the application execution 310, one or more select commands 306 will be sent to persistence layer 304 to obtain data desired for use by the application. If the selected data has been prefilled into a buffer in persistence layer 304, persistence layer 304 will source that data 309 to application execution 310 directly from the buffer. Otherwise, it will send a corresponding select 308 to database 350 to retrieve the desired data and source that data to the application. As application execution 310 progresses, updates 312 and 314 may be sent to persistence layer 304 and the buffers are updated. At the time these updates are sent, the update data will be encapsulated and stored in an update table 360 as persistence objects 322 and 324 respectively. Notably, additional selects may be sent to the persistence layer or at any time. Returned data may be read from either the buffers (not shown) or the database 350 depending on where the current data resides. In this example, these updates 312 and 314 occur during the business processing of the application execution. For example, such updates might be the result of customer-owned modules, that are executed during business processing.

At time 302, business processing ends. Additional updates for data handling may occur at that stage, such as update 316, 318 and 320, this corresponds to persistent objects 326, 328 and 330 in update table 360. Presuming no errors occurred, a commit writeback request 340 may be sent to persistent layer 302 after the updates have all been sent. Generally, it is not until receipt of the writeback request signal 340 that the persistence layer 304 will writeback and commit all the data from the various persistence objects 322, 324, 326, 328 and 330 to database 342. However, even when the application issues an update request, the session object dictates whether a database writeback will occur. For example, if the session object indicates simulation mode, no writeback will occur. If the session object indicates enterprise service mode the writeback may be delayed until the appropriate time as required by enterprise services. Notably, because these persistence objects are retained in the update table in a chronological order, only the aggregate of the data change is propagated to the database. Thus, if for example, update 318 changed data present in persistence object 322, the data from persistence object 322 would never be written to the database.

In other embodiments, other events may trigger writeback of the content of the update table 360. If an error occurs either during the remainder of the business processing or a rollback is otherwise required, the persistence layer may merely purge the update table of persistence objects and no database accesses are required to return the system to a consistent state. In other embodiments, such persistence objects are flagged when written back and deleted after commit.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Elements of embodiments of the present invention may also be provided as a machine-readable medium for storing the machine-executable instructions. The machine-readable medium may include, but is not limited to, flash memory, optical disks, compact disks read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense

What is claimed is:

1. An apparatus comprising:
a database;
a hardware memory;
a persistence layer to control access to the database by an application, the persistence layer having an update table residing in the memory to retain transaction data from the application before the transaction data is committed to the database, wherein the persistence layer has a simulation mode and wherein transaction data is persisted to a buffer responsive to an update command rather than the database when the persistence layer is in the simulation mode; and
a session context applied to the persistence layer the session context to define a condition for writeback to the database.

2. The apparatus of claim 1 wherein the persistence layer comprises:
a persistence manager to write a content of the update table to the database after all business logic in the application has completed processing of the transaction data.

3. The apparatus of claim 1 further comprising:
a plurality of data specific persistence managers instantiated by the persistence layer; and
a buffer in the memory associated with each data specific persistence manager.

4. A method comprising:
receiving database updates in a persistence layer between an application and a database;
aggregating the database updates from the application as persistence objects in an update table;
delaying a writeback to the database based on a session state of the persistence layer;
entering a simulation session in the persistence layer; and
writing the updates to a buffer rather than the database responsive to an update command during the simulation session.

5. The method of claim 4 further comprising:
permitting an overwrite of the buffer without writing back to the database when after the simulation session is complete.

6. The method of claim 4 further comprising:
writing back the persistence objects from the update table after all business logic in the application has completed processing corresponding transaction data.

7. The method of claim 4 further comprising:
prefilling a buffer with data from the database expected to be needed by the application; and
sourcing the data to the application from the buffer via the persistence layer.

8. The method of claim 4 wherein delaying comprises:
preventing database updates after a first execution of the application until a successive execution of the application on the data completes.

9. The method of claim 4 further comprising:
aggregating database updates from execution of a second application with the database updates of the application to avoid writing back temporary data to the database.

10. A non-transitory machine-accessible medium containing instructions that when executed cause a machine to:
receive database updates in a persistence layer between an application and a database;
aggregate the database updates from the application as persistence objects in an update table; delay a writeback to the database based on a session state of the persistence layer;
enter a simulation session in the persistence layer; and
write the updates to a buffer rather than the database responsive to an update command during the simulation session.

11. The non-transitory machine-accessible medium of claim 10 further comprising instructions causing the machine to:
permit an overwrite of the buffer without writing back to the database when after the simulation session is complete.

12. The non-transitory machine-accessible medium of claim 10 further comprising instructions causing the machine to:
writeback the persistence objects from the update table after all business logic in the application has completed processing corresponding transaction data.

13. The non-transitory machine-accessible medium of claim 10 further comprising instructions causing the machine to:

prefill a buffer with data from the database expected to be needed by the application; and source the data to the application from the buffer via the persistence layer.

14. The non-transitory machine-accessible medium of claim 10 wherein instructions causing the machine to delay includes instructions causing the machine to:

prevent database updates after a first execution of the application until a successive execution of the application on the data completes.

15. The non-transitory machine-accessible medium of claim 10 further comprising instructions causing the machine to:

aggregate updates from execution of a second application with the updates of the application to avoid writing back temporary data to the database.

* * * * *